US008443150B1

(12) United States Patent
de la Iglesia

(10) Patent No.: US 8,443,150 B1
(45) Date of Patent: May 14, 2013

(54) EFFICIENT RELOADING OF DATA INTO CACHE RESOURCE

(75) Inventor: Erik de la Iglesia, Sunnyvale, CA (US)

(73) Assignee: Violin Memory Inc., Mountain View, CA (US)

( * ) Notice: Subject to any disclaimer, the term of this patent is extended or adjusted under 35 U.S.C. 154(b) by 303 days.

(21) Appl. No.: 12/889,732

(22) Filed: Sep. 24, 2010

Related U.S. Application Data

(63) Continuation-in-part of application No. 12/814,438, filed on Jun. 12, 2010, and a continuation-in-part of application No. 12/605,119, filed on Oct. 23, 2009, now Pat. No. 8,214,599, said application No. 12/814,438 is a continuation-in-part of application No. 12/605,160, filed on Oct. 23, 2009, now Pat. No. 8, 214,608, said application No. 12/814,438 is a continuation-in-part of application No. 12/684,387, filed on Jan. 8, 2010.

(60) Provisional application No. 61/218,821, filed on Jun. 19, 2009, provisional application No. 61/111,304, filed on Nov. 4, 2008, provisional application No. 61/111,310, filed on Nov. 4, 2008, provisional application No. 61/144, 404, filed on Jan. 13, 2009.

(51) Int. Cl.
*G06F 12/08* (2006.01)

(52) U.S. Cl.
USPC ............ 711/135; 711/118; 711/133; 711/144

(58) Field of Classification Search .................. 711/118, 711/133, 135, 144
See application file for complete search history.

(56) References Cited

U.S. PATENT DOCUMENTS

| | | | |
|---|---|---|---|
| 5,829,019 A * | 10/1998 | Thompson et al. | ........... 711/113 |
| 5,954,796 A | 9/1999 | McCarthy et al. | |
| 6,041,366 A | 3/2000 | Maddalozzo et al. | |
| 6,401,147 B1 | 6/2002 | Sang et al. | |
| 6,636,982 B1 | 10/2003 | Rowlands | |
| 6,678,795 B1 | 1/2004 | Moreno et al. | |
| 6,721,870 B1 | 4/2004 | Yochai et al. | |

(Continued)

OTHER PUBLICATIONS

Mark Friedman, Odysseas Pentakalos. Windows 2000 Performance Guide. File Cache Performance and Tuning [reprinted online]. O'Reilly Media. Jan. 2002 [retrieved on Oct. 29, 2012]. Retrieved from the internet: <URL:http://technet.microsoft.com/en-us/library/bb742613.aspx#mainSection>.

(Continued)

*Primary Examiner* — Jae Yu

(57) ABSTRACT

A storage proxy includes a cache resource. A processor is configured to receive read and write requests sent from an initiator to a target over a first proxy path. The processor invalidates the cache lines when the read and write requests are redirected over a second direct path between the initiator and the target or when some other event indicates the data in the cache lines may no longer be consistent with corresponding data in the target. The processor identifies addresses for at least some of the cache lines that were previously valid and reloads the data for the identified addresses from the target back into some the cache lines when the read and write requests are redirected back over the first proxy path or when consistency can resumed between the data in the cache lines and corresponding data in the target.

22 Claims, 7 Drawing Sheets

U.S. PATENT DOCUMENTS

| Patent/Pub No. | Date | Inventor |
|---|---|---|
| 6,742,084 B1 | 5/2004 | Defouw et al. |
| 6,789,171 B2 | 9/2004 | Desai et al. |
| 6,810,470 B1 | 10/2004 | Wiseman et al. |
| 7,017,084 B2 | 3/2006 | Ng et al. |
| 7,089,370 B2 | 8/2006 | Luick |
| 7,110,359 B1 | 9/2006 | Acharya |
| 7,181,576 B2 * | 2/2007 | Gammel et al. ............. 711/144 |
| 7,856,533 B2 | 12/2010 | Hur et al. |
| 7,870,351 B2 | 1/2011 | Resnick |
| 7,873,619 B1 | 1/2011 | Faibish et al. |
| 7,975,108 B1 | 7/2011 | Holscher et al. |
| 8,010,485 B1 | 8/2011 | Chatterjee et al. |
| 2002/0035655 A1 | 3/2002 | Finn et al. |
| 2002/0175998 A1 | 11/2002 | Hoang |
| 2002/0194434 A1 | 12/2002 | Kurasugi |
| 2003/0012204 A1 | 1/2003 | Czeiger et al. |
| 2003/0167327 A1 | 9/2003 | Baldwin et al. |
| 2003/0177168 A1 | 9/2003 | Heitman et al. |
| 2003/0188219 A1 * | 10/2003 | DeRuiter et al. ................ 714/6 |
| 2003/0210248 A1 | 11/2003 | Wyatt |
| 2004/0128363 A1 | 7/2004 | Yamagami et al. |
| 2004/0146046 A1 | 7/2004 | Jo et al. |
| 2004/0186945 A1 | 9/2004 | Jeter et al. |
| 2004/0215923 A1 | 10/2004 | Royer |
| 2005/0025075 A1 | 2/2005 | Dutt et al. |
| 2005/0195736 A1 | 9/2005 | Matsuda |
| 2006/0005074 A1 | 1/2006 | Yanai et al. |
| 2006/0034302 A1 | 2/2006 | Peterson |
| 2006/0053263 A1 | 3/2006 | Prahlad et al. |
| 2006/0075191 A1 | 4/2006 | Lolayekar et al. |
| 2006/0112232 A1 | 5/2006 | Zohar et al. |
| 2006/0143432 A1 * | 6/2006 | Rothman et al. ................ 713/2 |
| 2006/0212524 A1 | 9/2006 | Wu et al. |
| 2006/0218389 A1 | 9/2006 | Li et al. |
| 2006/0277329 A1 | 12/2006 | Paulson et al. |
| 2007/0050548 A1 | 3/2007 | Bali et al. |
| 2007/0079105 A1 | 4/2007 | Thompson |
| 2007/0118710 A1 | 5/2007 | Yamakawa et al. |
| 2007/0124407 A1 | 5/2007 | Weber et al. |
| 2007/0192444 A1 | 8/2007 | Ackaouy et al. |
| 2007/0233700 A1 | 10/2007 | Tomonaga |
| 2007/0283086 A1 | 12/2007 | Bates |
| 2008/0028162 A1 | 1/2008 | Thompson |
| 2008/0098173 A1 | 4/2008 | Chidambaran et al. |
| 2008/0104363 A1 | 5/2008 | Raj et al. |
| 2008/0162864 A1 | 7/2008 | Sugumar et al. |
| 2008/0215827 A1 | 9/2008 | Pepper |
| 2008/0215834 A1 | 9/2008 | Dumitru et al. |
| 2008/0250195 A1 | 10/2008 | Chow et al. |
| 2008/0320269 A1 | 12/2008 | Houlihan et al. |
| 2009/0006725 A1 | 1/2009 | Ito et al. |
| 2009/0006745 A1 | 1/2009 | Cavallo et al. |
| 2009/0034377 A1 | 2/2009 | English et al. |
| 2009/0110000 A1 | 4/2009 | Brorup |
| 2009/0240873 A1 | 9/2009 | Yu et al. |
| 2009/0259800 A1 | 10/2009 | Kilzer et al. |
| 2009/0262741 A1 | 10/2009 | Jungck et al. |
| 2009/0276588 A1 | 11/2009 | Murase |
| 2009/0307388 A1 | 12/2009 | Tchapda |
| 2010/0011154 A1 | 1/2010 | Yeh |
| 2010/0030809 A1 | 2/2010 | Nath |
| 2010/0080237 A1 | 4/2010 | Dai et al. |
| 2010/0088469 A1 | 4/2010 | Motonaga et al. |
| 2010/0115206 A1 | 5/2010 | de la Iglesia et al. |
| 2010/0115211 A1 | 5/2010 | de la Iglesia et al. |
| 2010/0122020 A1 | 5/2010 | Sikdar et al. |
| 2010/0125857 A1 | 5/2010 | Dommeti et al. |
| 2010/0169544 A1 | 7/2010 | Eom et al. |
| 2010/0174939 A1 | 7/2010 | Vexler |
| 2011/0047347 A1 | 2/2011 | Li et al. |
| 2011/0258362 A1 | 10/2011 | McLaren et al. |
| 2012/0198176 A1 | 8/2012 | Hooker et al. |

OTHER PUBLICATIONS

Stolowitz Ford Cowger Listing of Related Cases, Feb. 7, 2012.
Rosenblum, Mendel and Ousterhout, John K., The LFS Storage Manager. Proceedings of the 1990 Summer Usenix. 1990 pp. 315-324.

* cited by examiner

EFFICIENT RELOADING OF DATA INTO CACHE RESOURCE

This application is a continuation in part of U.S. patent application Ser. No. 12/814,438 filed on Jun. 12, 2010 which claims priority to U.S. provisional patent application Ser. No. 61/218,821 filed on Jun. 19, 2009 which are both incorporated by reference in their entirety. This application is also a continuation in part of U.S. patent application Ser. No. 12/605,119 filed on Oct. 23, 2009 that claims priority to provisional patent application Ser. No. 61/111,304 which are both herein incorporated by reference in their entirety. This application is also a continuation in part of U.S. patent application Ser. No. 12/605,160 filed Oct. 23, 2009, that claims priority to U.S. provisional patent application Ser. No. 61/111,310 which are both herein incorporated by reference in their entirety. This application is also a continuation in part of U.S. patent application Ser. No. 12/684,387 filed Jan. 8, 2010 that claims priority to U.S. provisional patent application Ser. No. 61/144,404 which are both herein incorporated by reference in their entirety.

BACKGROUND

A proxy may be connected between different computing devices and operates on behalf of one or more of the computing devices. The proxy monitors messages exchanged between the computing devices and operates according to a current system state associated with the messages exchanged between the computing devices. Events may prevent the proxy from monitoring the messages exchanged between the computing devices and cause the proxy to lose track of the current state that exists between the computing devices. The proxy may delay operations or operate sub-optimally until a current state between the computing devices is re-determined.

DETAILED DESCRIPTION

Figure 1:
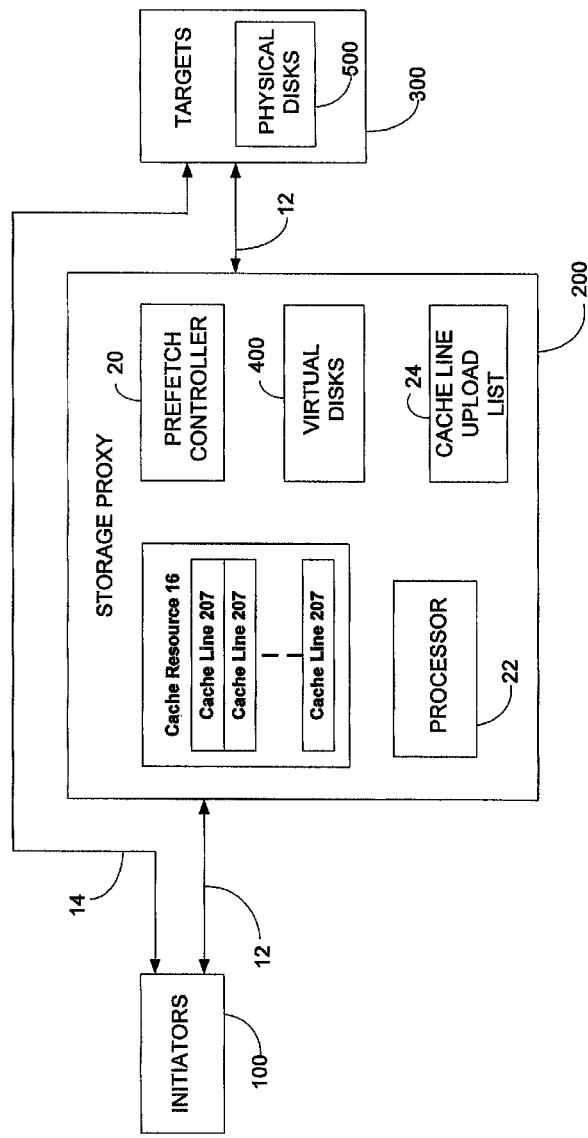
FIG. 1 is a block diagram of a storage proxy.

FIG. 1 shows a storage proxy 200 deployed between initiators 100 and targets 300. The initiators 100 can be any device or application that writes and reads data to and from another device. The targets 300 can be any device that stores data that is accessed by another device, application, software, initiator, etc. In some embodiments, the targets 300 are storage devices or storage servers that contain storage media such as solid state memory and/or storage disks. In one embodiment, the targets 300 contain multiple storage disks 500 that are referred to generally as a disk array. These storage disks may exist locally within the same physical enclosure as targets 300 or externally in a chassis connected to targets 300 through some interconnect mechanism. In one embodiment, storage disks 500 are virtualized by targets 300 to create virtual disks with different capacities and performance capabilities than the physical storage disks 500.

The initiators 100 and targets 300 can be directly connected, or connected to each other through a network or fabric. In some embodiments, the initiators 100 are servers, server applications, routers, switches, client computers, personal computers, Personal Digital Assistants (PDA), smart phones, or any other wired or wireless computing device that needs to access the data in targets 300.

In one embodiment, the initiators 100 may be stand-alone appliances, devices, or blades, and the targets 300 are stand-alone storage arrays. In some embodiments, the initiators 100, storage proxy 200, and targets 300 are each coupled to each other via wired or wireless Internet connections 12. In other embodiments, the initiators 100 may be a processor or software applications in a personal computer or server that accesses one or more targets 300 over an internal or external data bus. The targets 300 in this embodiment could be located in the personal computer or server 100, or could also be a stand-alone device coupled to the computer/initiators 100 via a computer bus or packet switched network connection.

The storage proxy 200 could be any hardware and/or software located in a storage appliance, wireless or wired router, gateway, firewall, switch, or any other computer processing system. The storage proxy 200 provides an abstraction of physical disks 500 in targets 300 as virtual disks 400. In one embodiment, the physical disks 500 and the virtual disks 400 may be identical in size and configuration. In other embodiments the virtual disks 400 could consist of stripes of data or volumes of data that extend across multiple different physical disks 500. In another embodiment, virtual disks 400 are simply presentations of existing virtual disks within targets 300 such that initiators 100 accessing said virtual disks are served data from either virtual disks 400 or disks controlled by targets 300. In such a configuration, data served by virtual disks 400 within storage proxy 200 would be expected to have lower latency or higher throughput, thereby demonstrating the rationale for deploying storage proxy 100.

Different communication protocols can be used over connections 12 between initiators 100 and targets 300. Typical protocols include Fibre Channel Protocol (FCP), Small Computer System Interface (SCSI), Advanced Technology Attachment (ATA) and encapsulated protocols such as Fibre Channel over Ethernet (FCoE), Internet Small Computer System Interface (ISCSI), Fibre Channel over Internet Protocol (FCIP), ATA over Ethernet (AoE) and others. In one embodiment, the communication protocol is a routed protocol such that any number of intermediate routing or switching agents may be used to abstract connection 12.

The initiators 100 conduct different storage operations with the physical disks 500 in targets 300 though the storage proxy 200. The storage operations may include write operations and read operations that have associated storage addresses. These interactions with storage proxy 200 and other components of storage proxy 200 may be normalized to block-level operations such as "reads" and "writes" of an arbitrary number of blocks.

Storage proxy 200 contains a cache resource 16 used for accelerating accesses to targets 300. The cache resource 16 includes an array of cache lines 207 that include both cache memory that stores data, and registers and logic that maintain a state for the different cache lines 207. The cache memory associated with cache lines 207 could be implemented with any memory device that provides relatively faster data access than the targets 300. In one embodiment, the memory in cache resource 16 could be any combination of Dynamic Random Access Memory (DRAM) and/or Flash memory. However, other types of relatively faster memory could also be used.

A prefetch controller 20 includes any combination of software and/or hardware within storage proxy 200 that controls cache resource 16. During a prefetch operation, prefetch controller 18 performs one or more reads to targets 300 beyond the read requested by initiators 100 and stores the additional data in cache resource 16. If subsequent read requests from initiators 100 request data in cache resource 16, storage proxy 200 returns the data directly from cache resource 16 instead of from targets 300. Such a direct return is referred to as a "cache hit" and reduces the read time for applications on initiators 100 accessing targets 300. For example, a memory access to targets 300 can take several milliseconds while a memory access to cache resource 16 may be in the order of microseconds. The logic and algorithms determining the length and address of such additional reads exists within prefetch controller 18 and may be influenced or programmed by processor 22.

Prefetch controller 18 can operate in both a monitoring mode and an active mode. When operating in the monitoring mode, the prefetch controller 18 monitors and records read and write operations from initiators 100 to targets 300. The prefetch controller 18 then uses the monitored information when performing subsequent tiering or caching operations.

High Availability Storage Systems

The storage system in FIG. 1 may be configured for active-passive high availability. This may include providing a direct connection 14 between the initiators 100 and the targets 300. The direct connection 14 can be established through a second set of Host Bus Adapter (HBA) fiber channel cards ports on the initiators 100 and targets 300 that are connected together.

The initiators 100 may normally send storage access requests over connections 12. The storage proxy 200 intercepts the storage access requests. If the data associated with the storage access requests is located in cache resource 16, the storage proxy 200 sends the identified data in the cache resource 16 to the initiators 100. If the data associated with a particular storage access request is not located in the cache resource 16, the storage proxy 200 forwards the storage access request to the targets 300. The targets 300 access the data from physical disks 500 and forwards the data back to the storage proxy 300 over connection 12. The storage proxy 200 then forwards the data received back from the targets 300 to the initiators 100.

The initiators 100 typically send storage access requests over connections 12. If the storage proxy 200 fails for any reason, the initiators 100 may start sending the storage access requests over direct connection 14. When the storage proxy 200 comes back on line, the initiators 100 start sending the storage access requests back over connections 12. The storage proxy 200 then resumes the prefetch and caching operations described above.

However, the data in cache resource 16 became inconsistent with the data in targets 500 when the initiators 100 switched over to direct connection 14. For example, storage proxy 200 no longer has knowledge of what write requests were sent by the initiators 100 over by-pass connection 14. The address for the data written into physical disks 500 may also correspond with a cache line 207 in cache resource 16. However, the data in cache line 207 now contains an out of date version of the data subsequently written into physical disks 500. Therefore, the data in cache line 207 is inconsistent with the data having the same corresponding physical address in physical disks 500.

To prevent data inconsistencies between the data in cache resource 16 and data in targets 300, all of the data in the cache resource 16 is invalidated whenever the initiators 100 start sending storage access requests over direct connection 14. The cache resource 16 is then repopulated during the normal course of prefetch and other operations performed by the storage proxy 200 while monitoring the storage access requests from initiators 100. However, it may take several hours or several days for the storage proxy 200 to reload the cache resource 16 with data in a state equivalent to what was maintained prior to the storage proxy 200 going offline. Although cache resource 16 must invalidate stored data when direct connection 14 is in use, it need not invalidate the address within targets 300 of said data stored within cache resource 16.

The cache resource 16 may have terabytes of storage space and the data currently loaded into the cache lines 207 may be based on read or write operations that were performed several days ago. For example, it may take several days for the storage proxy 200 to observe memory access patterns that result in the prefetch controller 20 loading a particular set of data into cache resource 16. The storage proxy 200 does not operate efficiency when the cache resource 16 contains large amounts of invalid or irrelevant data. Specifically, the cache resource 16 is less likely to contain the data requested by initiators 100 and is therefore more likely has to forward more read requests to the slower physical disks 500 in targets 300.

Improved Cache Loading

Figure 2:
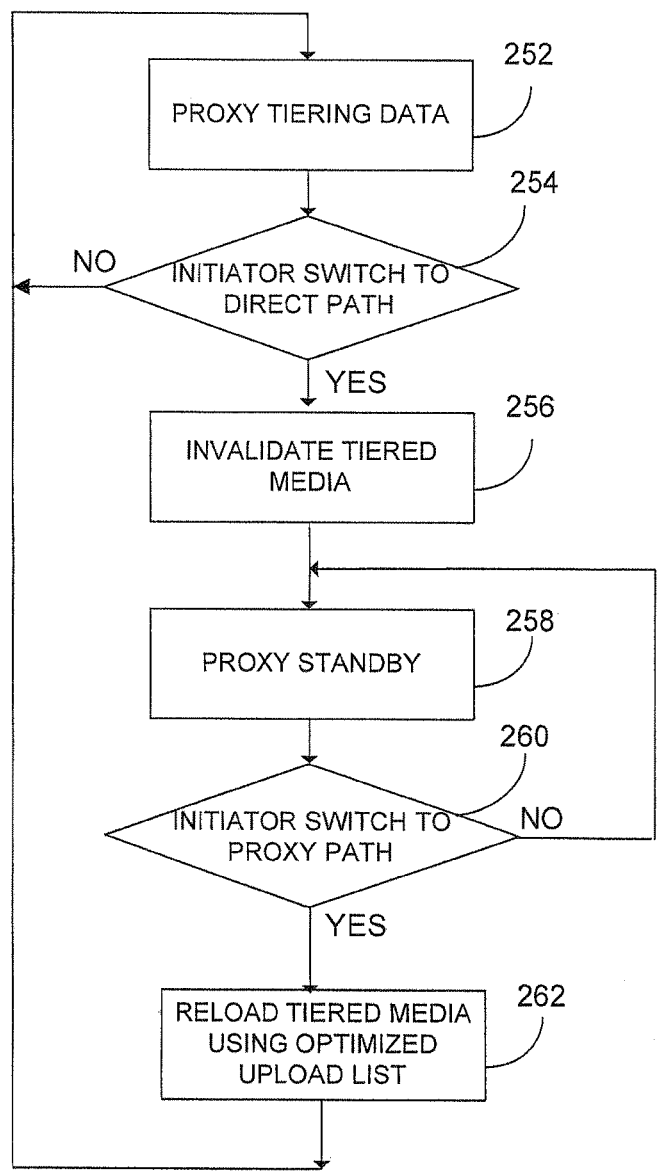
FIG. 2 is a flow diagram explaining how the storage proxy invalidates and uploads data.

FIG. 2 shows the operation of the storage proxy 200 when the initiator 100 switches from path 12 to direct path 14 for sending storage access requests. When storage access requests are sent over path 12, the storage proxy 200 in operation 252 tiers data when applicable into the cache resource 16. The storage proxy 200 in operation 254 determines that the initiator 100 switched over to direct path 14 for sending storage access requests to the targets 300. In other words, the storage proxy 200 can no longer monitor the storage access requests sent from initiator 100 to targets 300.

As explained above, a connection path change may be responsive to the storage proxy 200 failing or going offline condition. The path switch may also be identified when a corresponding path switch message is sent to the storage proxy 200. For example, a storage fabric reconfiguration message may indicate a path switch. Any other storage fabric messaging that indicates a change in the communication path can also be used. Responsive to the switch to direct path 14, the storage proxy 200 in operation 256 invalidates all of the cache lines in cache resource 16 in FIG. 1.

Invalidation of the cache lines 207 can also be triggered by other events that do not necessarily involve the initiators 100 switching to direct connection path 14 for sending storage access requests to targets 300. For example, the data in cache resource 16 may become inconsistent when a snapshot is taken of the data in targets 300. This snapshot condition and how it is detected by the storage proxy 200 is described in copending U.S. patent application Ser. No. 12/794,057 which is herein incorporated by reference in its entirety.

The storage proxy 200 may invalidate the data in the cache resource 16 by setting invalid flags in all of the cache lines 207. In one embodiment, the storage proxy 200 may switch any of the cache lines 207 that are currently valid into a previously valid state. Any cache line 207 that were previously invalid remains in the invalid state. The valid, invalid, and previously valid flags are contained in the state information 272 shown below in FIG. 3. In another embodiment, the previously valid flag is realized logically through some combination of existing flags (such as the combination of "valid" and "no cache resource" or "valid" and "null cache resource") to indicate that cache line 207 was previously valid.

In operation 258 the storage proxy 200 goes into a standby mode until the initiator 100 switches back to sending the storage access requests over the connection path 12 in operation 260. Again, the storage proxy 200 can determine the switch back to path 12 in FIG. 1 by a message or data received from initiator 100. For example, the storage proxy 200 may determine the initiator 100 switched back to path 12 based on when a SCSI inquiry message is received. Other methods of detecting a switch back to path 12, including integration with the operating system or software within initiators 100 is possible.

The storage proxy 200 in operation 262 uploads data from targets 300 back into the cache resource 16 using an optimized upload list 24 that is shown in FIG. 1. The upload list 24 identifies a group of cache lines that have qualified for uploading back into the targets 300. In one embodiment, the optimized upload list 24 identifies cache lines 207 that were previously valid prior to the initiator 100 switching to direct pay 14. In another embodiment, upload list 24 identifies cache lines 207 that were frequently used within a relatively short amount of time prior to the initiator 100 switching over to direct path 14.

The data identified in the upload list 24 is uploaded from physical disks 500 into cache resource 16. The upload operation is optimized to further reduce the amount of time required to place the cache resource 16 back into a state close to what existed prior to being invalidated in operation 256. As a result, the storage proxy 200 can start operating at a higher efficiently in less time. The optimized upload patterns are described in more detail below.

Figure 3:
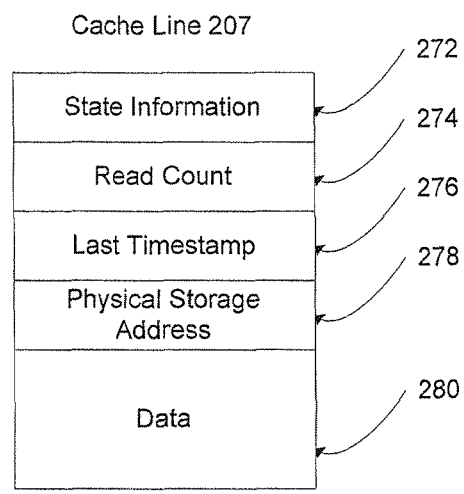
FIG. 3 is a block diagram showing a cache line in the storage proxy in more detail.

FIG. 3 shows in more detail some of the information contained in one of the cache lines 207 previously shown in FIG. 1. The information in the cache lines 207 may be stored in memory, registers, buffers, etc. that are located in storage proxy 200. State information 272 identifies a current state of the cache line 207. For example, the cache line 207 may be identified in state information 272 as valid, invalid, or previously valid. A read count value 274 indicates how many times the data in cache line 207 was read over some predetermined time period.

A last timestamp value 276 indicates the last time the data in cache line 207 was read. A physical storage address 278 is associated with the location in physical disks 500 where the data 280 in cache line 280 is also located. Contiguous cache lines 207 may contain contiguous blocks of data from targets 300. Therefore, a physical storage address 278 may not be needed for each individual cache line 207.

The processor 22 may or may not need the state information 272 to derive the upload list 24 in FIG. 1. For example, the processor 22 may only conduct upload operations for the cache lines 207 that were tagged in state information 272 as previously valid. However, in another embodiment, the processor 22 may not care if the cache line was previously valid. In this embodiment, the upload operations may be associated with cache lines that have last timestamp values 276 less than a particular time limit and read count values 274 greater than a particular count limit. In other embodiments, other combinations of the state information 272, read count value 274, and last timestamp value 276 are taken into consideration when generating the optimized upload list 24.

Figure 4:
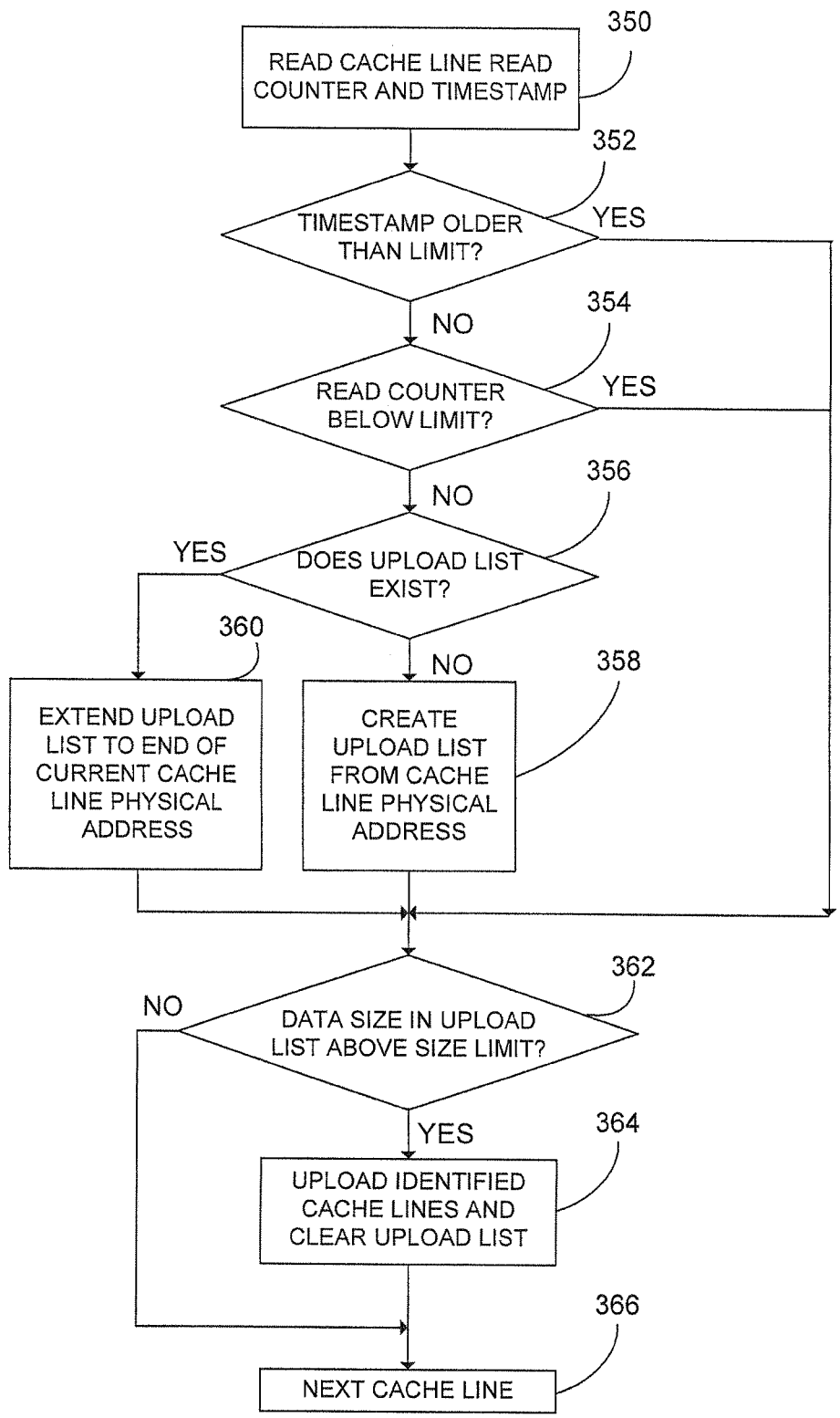
FIG. 4 is a flow diagram showing in more detail how the storage proxy more efficiently uploads data into a cache resource.

FIG. 4 shows how the processor 22 in FIG. 1 conducts the upload operations. The upload operations are triggered in operation 262 of FIG. 2 when the initiator 100 switches back to the proxy connection path 12 in FIG. 1. For other embodiments, the upload operations may be triggered by other events that allow the storage proxy 200 to start loading tiering data back into cache resource 16. In operation 350 the processor 22 reads the read count value 274 and the last timestamp value 276 for a first cache line 207. If the timestamp value 276 is older than a predetermined value in operation 352 or the read count value 274 is below a predetermined number in operation 354, the processor 22 does not create an upload list 24 or will not extend a previously created upload list 24.

A timestamp less than the predetermined limit indicates the associated cache line 207 has been recently read and is more likely to provide cache hits if reloaded back into the cache resource 16. A read count value 274 above a predetermined limit indicates the associated cache line 207 has been frequently read over a prior time period and is also likely to provide cache hits if uploaded back into cache resource 16. If the last timestamp value 276 is below the predetermined limit in operation 352 and the read count value 274 is above the predetermined limit in operation 354, the processor in operation 356 determines if an upload list 24 currently exists.

The processor 22 creates an upload list 24 in operation 358 if one does not exist in operation 356. The upload list 24 identifies the address range for the data in the currently analyzed cache line 207. For example, the cache line 207 may be 4 thousand bytes (KB) wide and may have a physical storage address 278 in FIG. 3 of 5000. The processor 22 in operation 358 creates an upload list 24 identifying the address range 5000 to 9000.

The processor in operation 360 extends the upload list 24 to include the address range of the currently analyzed cache line 207, if one already exists in operation 356. For example, a next qualifying cache line 207 after the cache line at address 5000 may start at address 9000. The cache line at address 9000 also has a last timestamp value 276 below the time limit in operation 352 and has a read count value 274 above the count limit in operation 354. In operation 360 the processor extends the address range in upload list 24 to start at address 5000 and end at address 12,000.

The processor in operation 362 determines if the address range identified in the upload list 24 is above a predetermined size. For example, the predetermined size could be set at 250 KBs, 500 KBs, 1 million bytes (MBs), or any other configurable value. If the data size associated with the address range in the upload list 24 is not over the size limit, the processor analyzes the next cache line 207 in the cache resource 16 in operation 366. If data size associated with the address range in the upload list 24 is above the size limit in operation 362, the processor 22 uploads the data at the identified address range within targets 300 back into the cache resource 16. The processor 22 flags the uploaded data in the cache lines 207 as valid in state information 272 and moves on to the next cache line 207 in operation 366.

A large address range may exist between two cache lines that qualify for adding to the upload list 24. For example, a first cache line associated with address 0 may be added to the upload list 24 and the next cache line that qualifies for the upload list 24 may be associated with address 40,000. The address range in the upload list 24 would then start at address 0 and end at address 44,000. This could result in the processor 22 uploading nearly 176 MBs of data into the cache resource 16 when only two of the 4 KB cache lines 207 qualified for uploading.

The processor 22 can be programmed with a second upload limit in operation 364 that resets the upload list 24 after a particular amount of data is identified. For example, the upload limit may be 250 KBs. The processor 22 would conduct a first 250 KB upload operation starting at address 0 that contains the data for the first qualifying cache line 207 and conduct a second 250 KB upload operation starting at address 40,000 that contains the data for the second qualifying 4 KB cache line 207.

In another embodiment, the process may abort uploading a particular cache line 207 if the space between that cache line and a next upload qualifying cache line 207 is too large. Using the same example, the first upload qualifying cache line 207 starts at address 0 and the next upload qualifying cache line 207 starts at address 40,000. The processor 22 in operation 358 starts an upload list 24 that starts at address 0. The processor in operation 360 determines that the address gap between the first upload qualifying cache line 207 and the next upload qualifying cache line 207 is greater than a predetermined threshold. As mentioned above, in this example, the address gap is nearly 166 MBs. The processor 22 in operation 360 resets the starting address of the upload list 24 to the starting address 40,000 of the second cache line. This prevents the first cache line at address 0 from being uploaded. However, not uploading the first qualifying cache line is less likely to affect the performance of the storage proxy 200 than uploading 176 MBs of data into the cache resource 16 that might produce a relatively few number of cache hits. The decision to not upload a cache line may be driven by configuration within processor 22.

Loading Data Clusters

Figure 5:
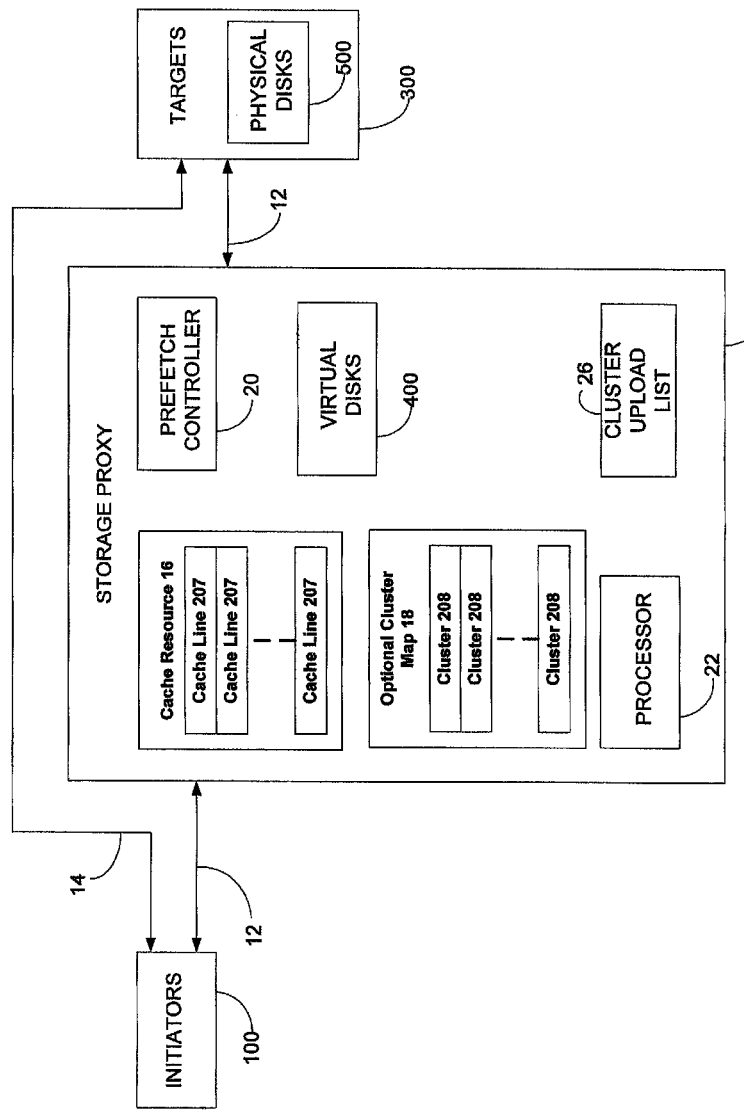
FIG. 5 shows another embodiment of the storage proxy shown in FIG. 1 that uses a cluster map to upload data.

FIG. 5 shows an optional cluster map 18 that may be used in the storage proxy 200 to identify groups of contiguous data blocks that may have a particular association. The prefetch controller 20 may monitor the read operations from the initiators 100 and determine that groups or "clusters" of contiguous data blocks are associated either temporally or spatially. For example, the prefetch controller 20 may determine that a particular cluster of data blocks are accessed sequentially or may determine that a particular cluster of data blocks are accessed around the same time.

The prefetch controller 20 identifies the address range and other state information for a cluster 208. The prefetch controller 20 then monitors the subsequent read operations from initiators 100. If the address of a read request comes within one of the address range identified in one of the clusters 208, the prefetch controller 20 may load the entire cluster of contiguous data blocks from physical disks 500 into cache resource 16. Generating and using the cluster map 18 is described in more detail in U.S. patent application Ser. Nos. 12/814,438 filed on Jun. 12, 2010; Ser. No. 12/605,119 filed on Oct. 23, 2009; and Ser. No. 12/605,160 filed Oct. 23, 2009 and are all incorporated by reference in their entireties.

Figure 6:
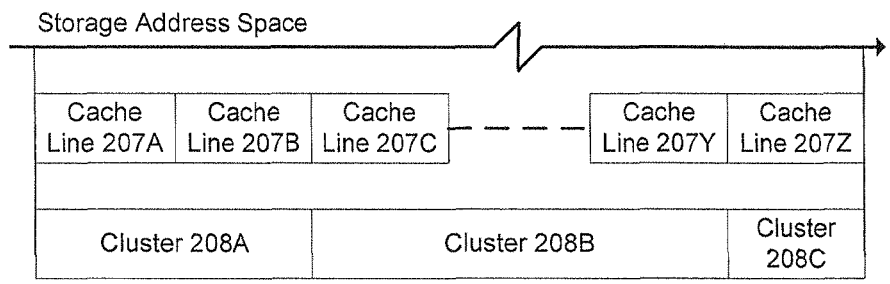
FIG. 6 is a block diagram showing how cache lines are mapped into clusters.

FIG. 6 shows a first group of cache lines 207A and 207B associated with a cluster 208A. A second set of cache lines 207C-207Y are associated with a cluster 208B and a third cache line 207Z is associated with a cluster 208C. The processor 22 in FIG. 5 associates the cache lines 207 with the clusters 208 according to any of the schemes described in the above referenced patent applications that have been incorporated by reference.

One embodiment associates clusters 208 with contiguous groups of cache lines 207. However, the cluster operations can also be associated with data blocks that are not necessarily delineated on cache line boundaries. For example, the clusters 208 could be associated with blocks of data that are larger or smaller then the size of cache lines 207.

Figure 7:
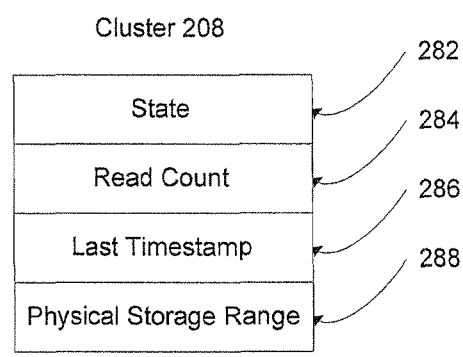
FIG. 7 is a block diagram showing information stored in a cluster.

FIG. 7 shows the information associated with a particular cluster 208. Similar to the cache lines 208, the information for clusters 208 may be contained in memory, registers, buffers, or any other storage element in the storage proxy 200. The state information 282 can identify a state of the cluster 208 as valid, invalid, or previously valid. The read count information 284 indicates the number of times the cluster 208 was read within some previously predetermined time period.

In one embodiment, all of the cache lines 207 associated with a particular cluster 208 have the same number of reads. For example, the algorithms used to derive the clusters 208 may be based on cache lines 207 having the same number of reads. In this embodiment, the processor 22 can obtain the read count value 284 from any of the cache line read count values 274 associated with that cluster 208 as shown in FIG. 3. However, other schemes may create clusters of cache lines 207 with different read count values. In these embodiments, the read count value 284 may be an average, minimum, or maximum of the read count values 274 for the group of cache lines 207 associated with the cluster 208.

The cluster last timestamp value 286 indicates a time of a most recently accessed one of the cache lines 207 associated with that particular cluster 208. The processor 22 can determine the timestamp value 286 simply by using the cache line 207 associated with that particular cluster 208 with shortest timestamp value 276.

The physical storage range 288 contains the address range for the group of cache lines 207 associated with that particular cluster 208. For example in FIG. 6, the cluster 208B has a physical storage range 288 that starts at the address associated with cache line 207C and ends at the address 278 associated for cache line 207Y. The last timestamp value 286 for cluster 208B will be the timestamp value 276 for the cache line 207C-207Y that was last read by storage proxy 200 pursuant to a read request from initiators 100. Because the physical storage range 288 is contiguous, any cluster 208 that is determined suitable for uploading can be read without the risk of wasting space on intervening unsuitable cache lines (such as would be the case for a non-cluster driven approach). Every cache line for the address range within cluster 208 has the same relevant properties for the purpose of determining suitability for upload.

Figure 8:
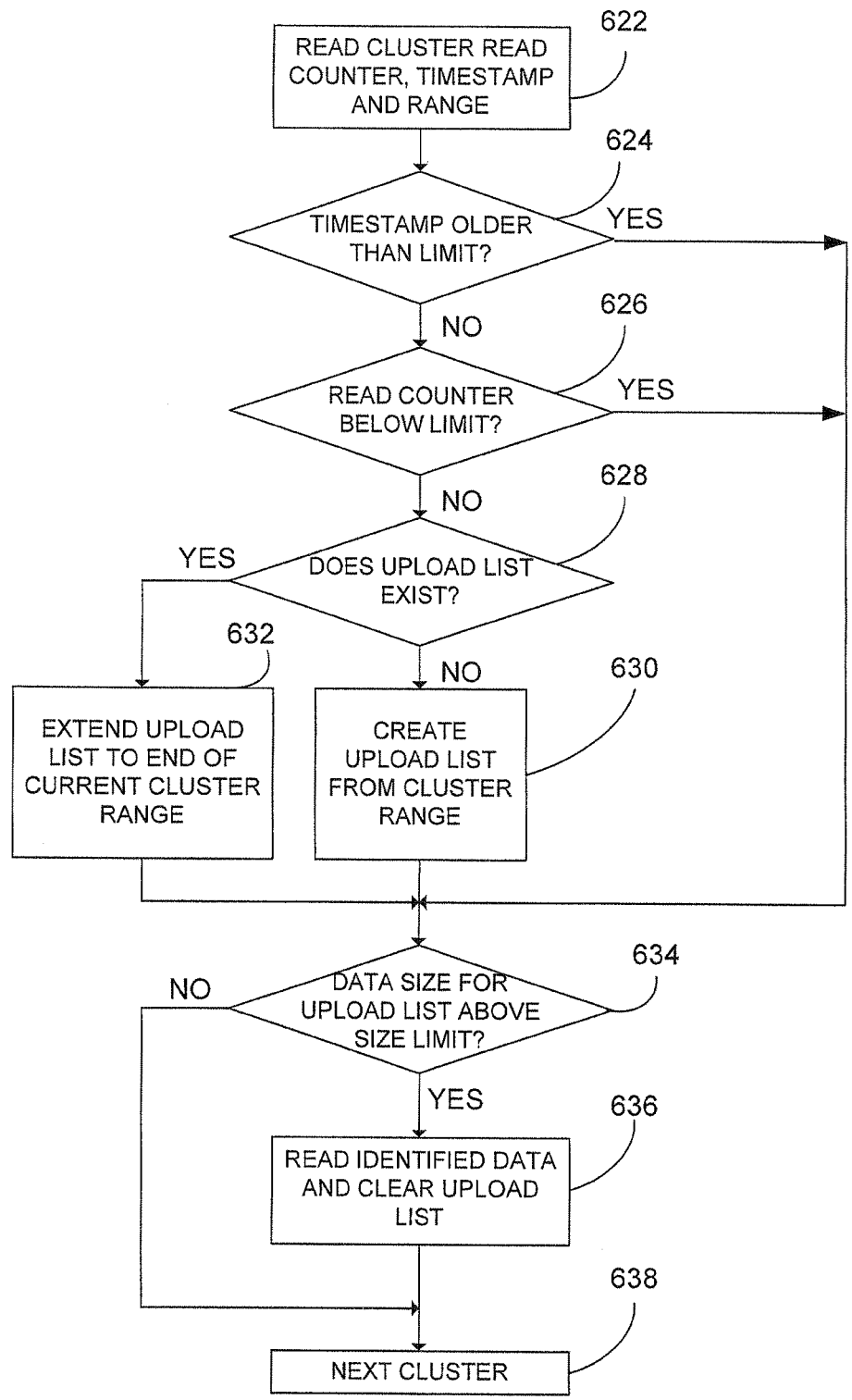
FIG. 8 is a flow diagram showing how the storage proxy in FIG. 5 uploads data according to the cluster map in FIG. 5.

FIG. 8 describes a cluster upload operation in more detail. The cluster upload operation is also triggered in operation 262 of FIG. 2 when the initiator 100 switches back to sending storage access request over the proxy connection path 12 in FIG. 5. As also mentioned above, the processor 22 could set a previously valid flag for the clusters 208 that were previously valid prior to the invalidation operation in operation 256 in FIG. 2. The processor 22 could then upload data from targets 300 for any of the cluster of cache lines that are indicated as previously valid in state information 282.

However, to further optimize cache resource uploading, the processor 22 uploads data into the cache resource 16 according to a generated upload list. In operation 622 the processor reads the read count value 284, last timestamp value 286, and address range value 288 for a first cluster 208. The processor in operation 624 determines if the last timestamp value 286 for the cluster 208 is older than a predetermined time limit. This could be the same or could be different than the time limit used in operation 352 of FIG. 4. The read count value 284 is compared with a predetermined count limit in operation 626. This could be the same or different than the read count limit 274 used in operation 354 in FIG. 4.

If the last timestamp value 286 is older than the predetermined time limit in operation 624 or the read count value 284 is below the predetermined count limit in operation 626 the processor 22 moves onto the next cluster 208 in operation 638. If the last timestamp value 286 is less than the predetermined time limit and the read count value 284 is above the count limit, the processor in operation 630 creates a cluster upload list 26 shown in FIG. 5. The cluster upload list 26 contains the physical storage range 288 associated with the cluster 208.

If a next cluster 208 qualifies under operations 624 and 626 for adding to the cluster upload list 26, the processor 22 adds the storage range 288 of the next cluster 208 to the existing cluster upload list 26. For example, the first qualifying cluster 208 may have a storage range of 500-700 and the second qualifying cluster 208 may have a storage range of 800-1000. The cluster upload list 26 is initially created for the first cluster in operation 630 with an address range of 500-700. The cluster upload list 26 is then extended in operation 632 to an address range of 500-1000 to include the second cluster 208.

The process in operation 634 determines if the data size associated with the upload list 26 is above a predetermined size limit. The size limit may be the same or different from the size limit used in operation 362 in FIG. 4. If the data size in the upload list 26 exceeds the size limit, the processor reads the data from targets 300 associated with the address range in upload list 26 and loads the data into the cache resource 16. If the data size in the upload list 26 does not exceed the size limit, the next cluster 208 is analyzed in operation 638.

Again, the processor 22 may load sub-portions of the upload data into the cache resource 16 at a time. For example, the processor 22 may read data from targets 300 in 128 KB blocks. If the cluster upload list 26 has an address range of 1 MBs, the processor 22 may read 8 separate 128 KB block of data from targets 300 and individually upload the eight 128 KB blocks of data into the cache resource 16.

The storage proxy 200 can read ten contiguous 4 KB block of data from targets 300 faster than ten 4 KB blocks of data with random non-contiguous address locations. By creating upload lists and reading groups of contiguous data blocks, the storage proxy 200 is able to further reduce the amount of time required to repopulate the cache lines 207 in the cache resource 16 with relevant data. Thus, the storage proxy 200 is able to start operating more effectively in a shorter amount of time after coming back on-line.

Hardware and Software

Several examples have been described above with reference to the accompanying drawings. Various other examples are also possible and practical. The systems and methodologies may be implemented or applied in many different forms and should not be construed as being limited to the examples set forth above. Some systems described above may use dedicated processor systems, micro controllers, programmable logic devices, or microprocessors that perform some or all of the operations. Some of the operations described above may be implemented in software or firmware and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Digital Processors, Software and Memory Nomenclature

As explained above, embodiments of this disclosure may be implemented in a digital computing system, for example a CPU or similar processor. More specifically, the term "digital computing system," can mean any system that includes at least one digital processor and associated memory, wherein the digital processor can execute instructions or "code" stored in that memory. (The memory may store data as well.)

A digital processor includes but is not limited to a microprocessor, multi-core processor, Digital Signal Processor (DSP), Graphics Processing Unit (GPU), processor array, network processor, etc. A digital processor (or many of them) may be embedded into an integrated circuit. In other arrangements, one or more processors may be deployed on a circuit board (motherboard, daughter board, rack blade, etc.). Embodiments of the present disclosure may be variously implemented in a variety of systems such as those just mentioned and others that may be developed in the future. In a presently preferred embodiment, the disclosed methods may be implemented in software stored in memory, further defined below.

Digital memory, further explained below, may be integrated together with a processor, for example Random Access Memory (RAM) or FLASH memory embedded in an integrated circuit Central Processing Unit (CPU), network processor or the like. In other examples, the memory comprises a physically separate device, such as an external disk drive, storage array, or portable FLASH device. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such a conventional rotating disk drive. All such memories are "machine readable" in that they are readable by a compatible digital processor. Many interfaces and protocols for data transfers (data here includes software) between processors and memory are well known, standardized and documented elsewhere, so they are not enumerated here.

Storage of Computer Programs

As noted, some embodiments may be implemented or embodied in computer software (also known as a "computer program" or "code"; we use these terms interchangeably). Programs, or code, are most useful when stored in a digital memory that can be read by one or more digital processors. The term "computer-readable storage medium" (or alternatively, "machine-readable storage medium") includes all of the foregoing types of memory, as well as new technologies that may arise in the future, as long as they are capable of storing digital information in the nature of a computer program or other data, at least temporarily, in such a manner that the stored information can be "read" by an appropriate digital processor. The term "computer-readable" is not intended to limit the phrase to the historical usage of "computer" to imply a complete mainframe, mini-computer, desktop or even laptop computer. Rather, the term refers to a storage medium readable by a digital processor or any digital computing system as broadly defined above. Such media may be any available media that is locally and/or remotely accessible by a computer or processor, and it includes both volatile and non-volatile media, removable and non-removable media, embedded or discrete.

Having described and illustrated a particular example system, it should be apparent that other systems may be modified in arrangement and detail without departing from the principles described above. Claim is made to all modifications and variations coming within the spirit and scope of the following claims.

The invention claimed is:

1. An apparatus, comprising:
cache lines configured to store copies of data from a storage target; and
logic circuitry configured to invalidate the cache lines when the copies of the data in the cache resource may be inconsistent with the data in the storage target, the logic circuit further configured to identify addresses for at least some cache lines that were previously valid and reload copies of the data at the identified addresses from the storage target into some of the cache lines.

2. The apparatus of claim 1 wherein the logic circuitry is configured to invalidate the cache lines when storage access requests can no longer be monitored and reload copies of data from the storage target into the cache lines when the storage access requests can start being monitored.

3. The apparatus of claim 1 wherein the cache lines include read count values identifying a number of times the cache lines were read over a predetermined time period and last timestamp values identifying a last time and the cache lines were read.

4. The apparatus of claim 3 wherein the logic circuitry is configured to identify the previously valid cache lines according to the read count values and last timestamp values.

5. The apparatus of claim 1 wherein the logic circuitry is configured to derive an address range that includes the addresses for multiple previously valid cache lines and upload the data located at the address range from the storage target into the cache lines.

6. The apparatus of claim 5 wherein the logic circuitry is configured to upload the data from the storage target to the cache lines when the address range reaches a threshold value.

7. The apparatus according 1 wherein the logic circuitry is configured to:
identify a first address associated with a first previously valid cache line;
identify an address range that includes the first address;
identify a second address associated with a second previously valid cache line;
extend the address range to include the second address when a gap between the first address and the second address range is under a threshold; and
extend the address range to only include the second address when a gap between the first address and the second address range is over a threshold.

8. The apparatus of claim 1 further comprising a cluster map identifying a cluster address range for a contiguous set of the cache lines, wherein the logic circuitry is configured to reload data at the cluster address range in the storage target into the cache lines.

9. The apparatus of claim 8 wherein the cluster map includes:
a read count value identifying a number of times the contiguous set of cache lines was read; and
a last timestamp value identifying a last time the contiguous set of cache lines was read.

10. The apparatus of claim 9 wherein the logic circuitry is configured to identify the cluster address range according to the read count value and the last timestamp value.

11. A computer readable medium containing instructions configured to be executed by a computer system, the instructions when executed by the computer system comprising:
loading data from a storage disk into cache lines in a cache resource;
invalidating the cache lines when a condition is detected where consistency might not be maintained between the data in the cache resource and corresponding data in the storage disk;
identifying addresses for previously valid cache lines; and
reloading data corresponding with the addresses from the storage disk into some of the cache lines when consistency can be maintained between the data in the cache resource and the corresponding data in the storage disk.

12. The computer readable medium according to claim 11 further comprising:
tracking read count values for the cache lines;
identifying last timestamp values for the cache lines; and
identifying the previously valid cache lines according to the read count values and last timestamp values.

13. The computer readable medium according to claim 11 further comprising:
identifying a first address associated with a first one of the previously valid cache lines;
identifying a second address associated with a second one of the previously valid cache lines;
identifying an address range that includes the first address and the second address; and
uploading data within the address range in the storage disk into the cache lines.

14. The computer readable medium according to claim 13 further comprising uploading the data from the storage disk into the cache lines when the address range reaches a size limit.

15. The computer readable medium according to claim 13 further comprising:
identifying an address gap between the first address and the second address;
modifying the address range to begin at the second address and not include the first address when the address gap is above a threshold.

16. The computer readable medium according to claim 11 further comprising:
identifying a cluster of cache lines;
identify an address range that extends over addresses associated with the cluster of cache lines; and
uploading data within the address range in the storage disk into the cache lines.

17. The computer readable medium according to claim 16 further comprising uploading the data within the address range when a read count value for the cluster of cache lines is above a count threshold and a last timestamp value for the cluster of cache lines is less than a time threshold.

18. The computer readable medium according to claim 11 further comprising:
identifying a first cluster of cache lines;
identifying a first address range for the first cluster of cache lines;
identifying a second cluster of cache lines;
identifying a second address range for the second cluster of cache lines;
identifying a third address range that extends over the first address range and the second address range; and
uploading data for the third storage range in the storage disk into the cache lines.

19. A storage proxy, comprising:
a cache resource including cache lines; and
a processor configured to receive storage access requests sent over a first proxy path from an initiator to a target and invalidate the cache lines when the storage access requests are redirected over a second direct path between the initiator and the target, the processor further configured to identify addresses for at least some of the cache lines that were previously valid and reload the data from the target at the identified addresses into some of the cache lines.

20. The storage proxy of claim 19 wherein the processor is configured to identify the cache lines that were previously valid according to a number of times the cache lines were read.

21. The storage proxy according to claim 20 wherein the processor is configured to identify the cache lines that were previously valid according to when the cache lines were last read.

22. The storage proxy according to claim 20 wherein the processor is configured to:
   identify a first address for a first one of the cache lines that was previously valid;
   identify an address range that includes the first address;
   identify a second address for a second one of the cache lines that was previously valid;
   extend the address range to extend from the first address to the second address; and
   upload data located at the address range in the target to the cache lines when the address range reaches a threshold.

* * * * *